(No Model.) 6 Sheets—Sheet 1.

R. LEY.
PEGGING MACHINE.

No. 492,906. Patented Mar. 7, 1893.

Witnesses:
Eustace Hopkins
Paul Aulich

Inventor:
Rudolph Ley
by
Attorneys (No Model.) 6 Sheets—Sheet 3.
R. LEY.
PEGGING MACHINE.

No. 492,906. Patented Mar. 7, 1893.

Witnesses:
Eustace Hopkins
Paul Aulich

Inventor:
Rudolph Ley
by
Attorneys (No Model.) 6 Sheets—Sheet 4.

R. LEY.
PEGGING MACHINE.

No. 492,906. Patented Mar. 7, 1893.

Fig. 4.

Witnesses:
Eustace Hopkins
Paul Aulich

Inventor:
Rudolph Ley
by
Attorneys

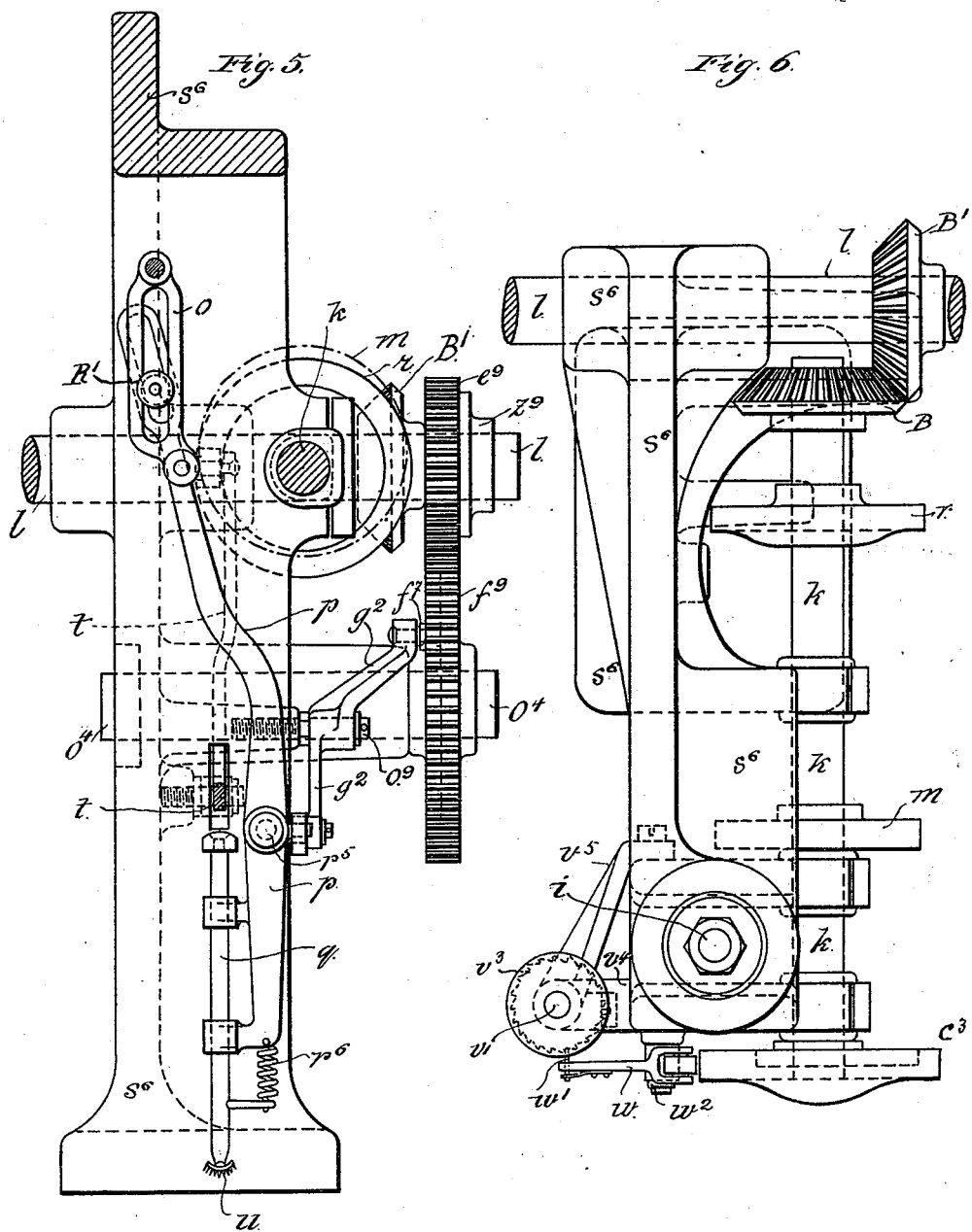

(No Model.) 6 Sheets—Sheet 6.
R. LEY.
PEGGING MACHINE.
No. 492,906. Patented Mar. 7, 1893.
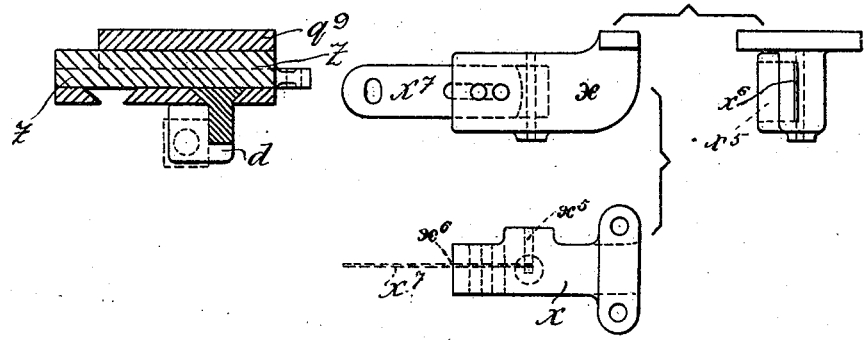
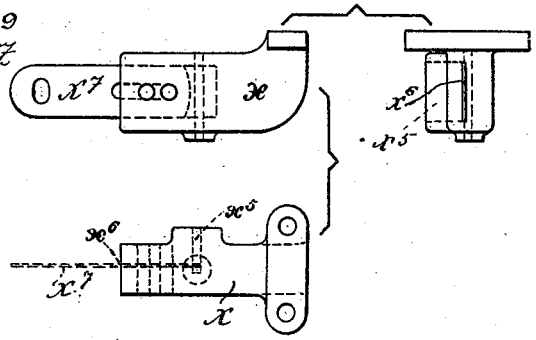
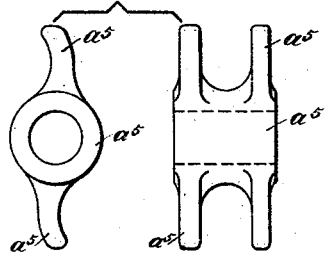
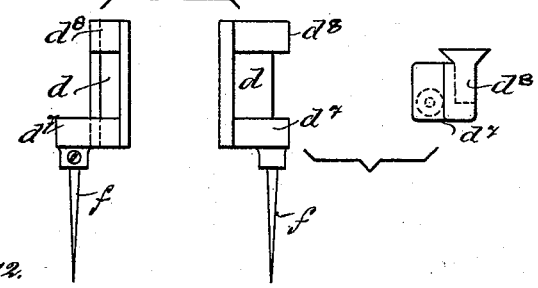
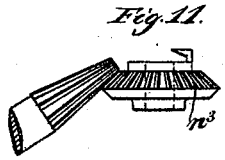
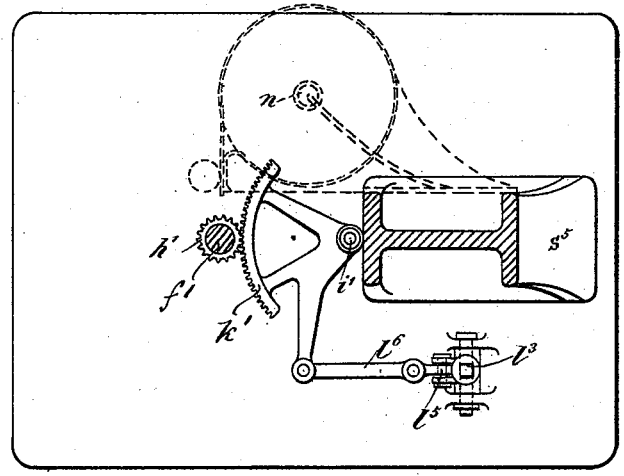
Witnesses: Eustace Hopkins. Paul Aulish.
Inventor: Rudolph Ley
by Attorneys

UNITED STATES PATENT OFFICE.

RUDOLPH LEY, OF ARNSTADT, GERMANY.

PEGGING-MACHINE.

SPECIFICATION forming part of Letters Patent No. 492,906, dated March 7, 1893.

Application filed June 29, 1889. Serial No. 316,120. (No model.) Patented in Germany October 22, 1885, No. 36,280, and in England June 7, 1889, No. 9,460.

*To all whom it may concern:*

Be it known that I, RUDOLPH LEY, a subject of the Prince of Schwarzburg-Sondershausen, and a resident of Arnstadt, in Thuringia, Germany, have invented certain new and useful Improvements in Machines for Pegging Boots and Shoes without Using Lasts, of which the following is an exact description, (for which I have obtained Letters Patent in England, No. 9,460, dated June 7, 1889, and in Germany, No. 36,280, dated October 22, 1885, [principal patent,] additional patents, No. 40,489, dated November 18, 1886, and No. 49,445, dated January 31, 1889,) of which the following is a specification.

In order to make my description more clear, I refer to the accompanying drawings in which similar letters denote similar parts throughout the several views.

Figure 1:
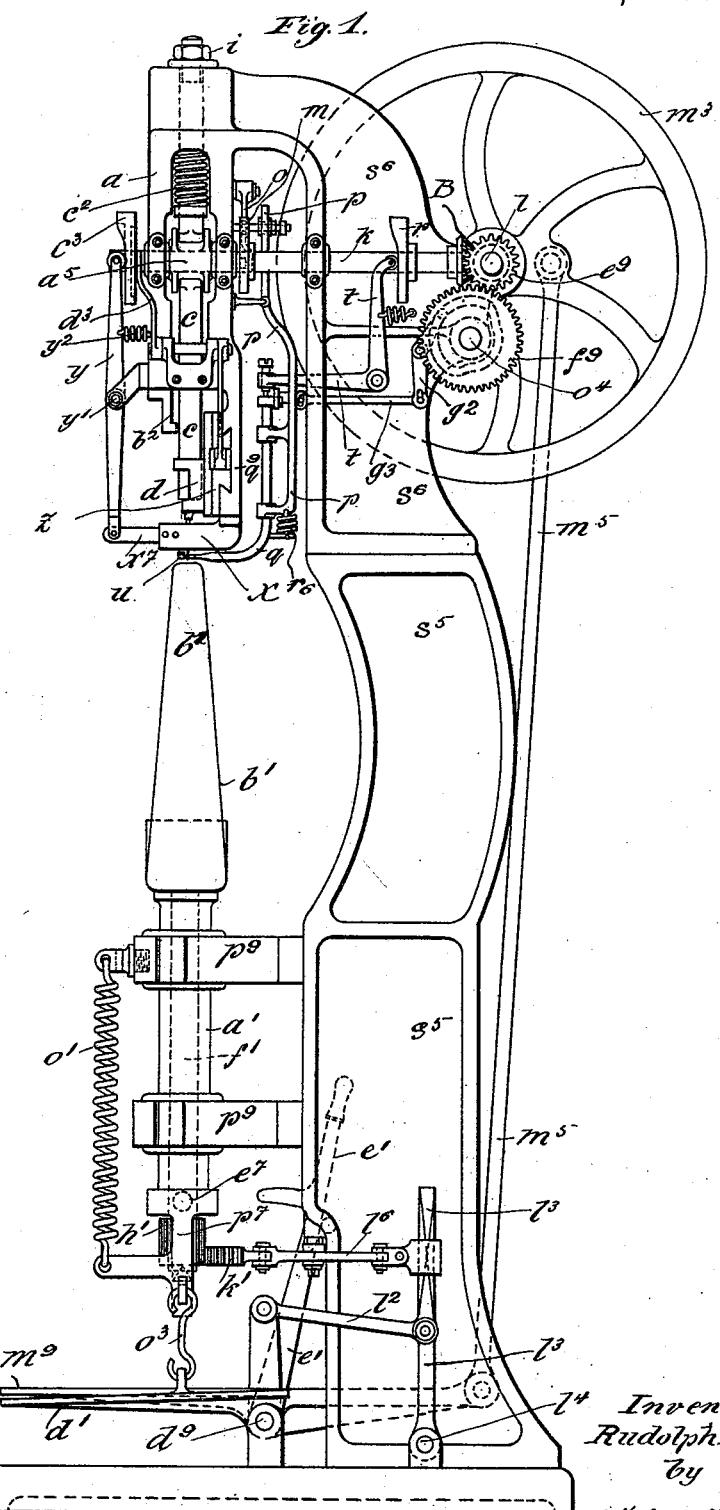
Figure 2:
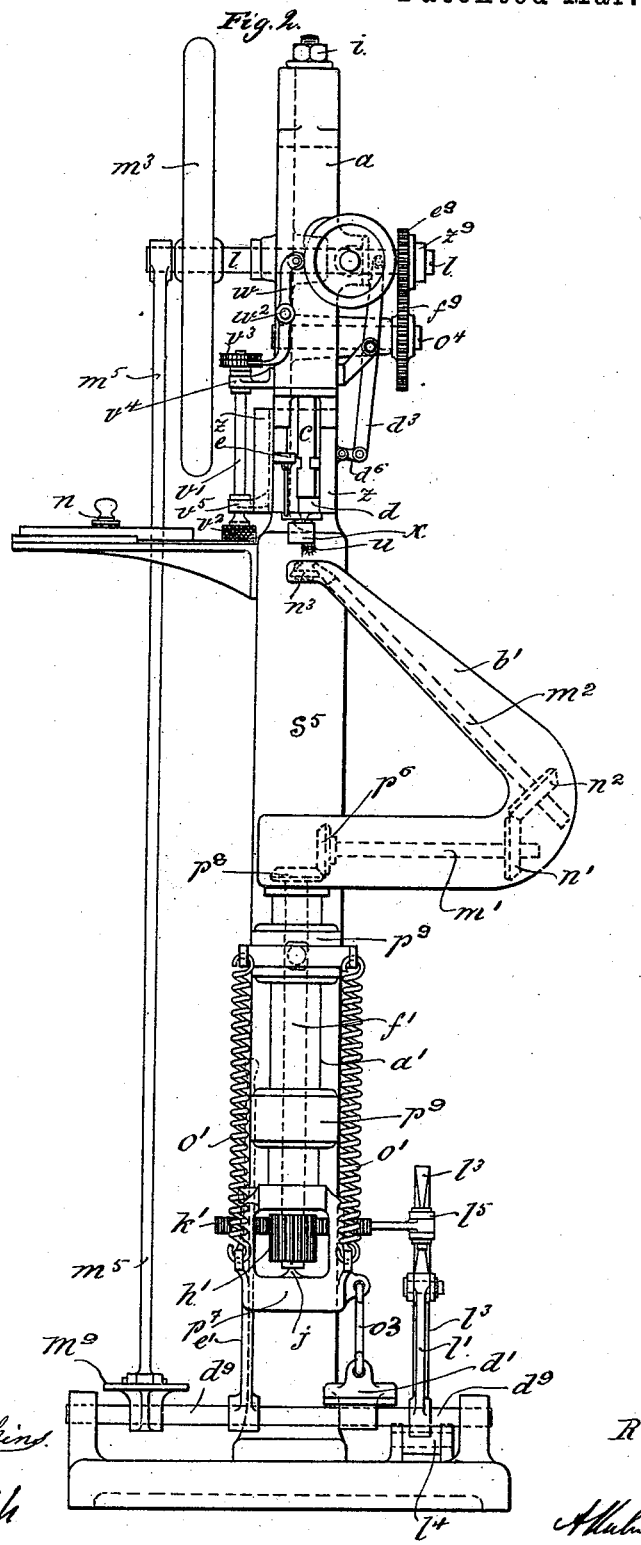
Figure 3:
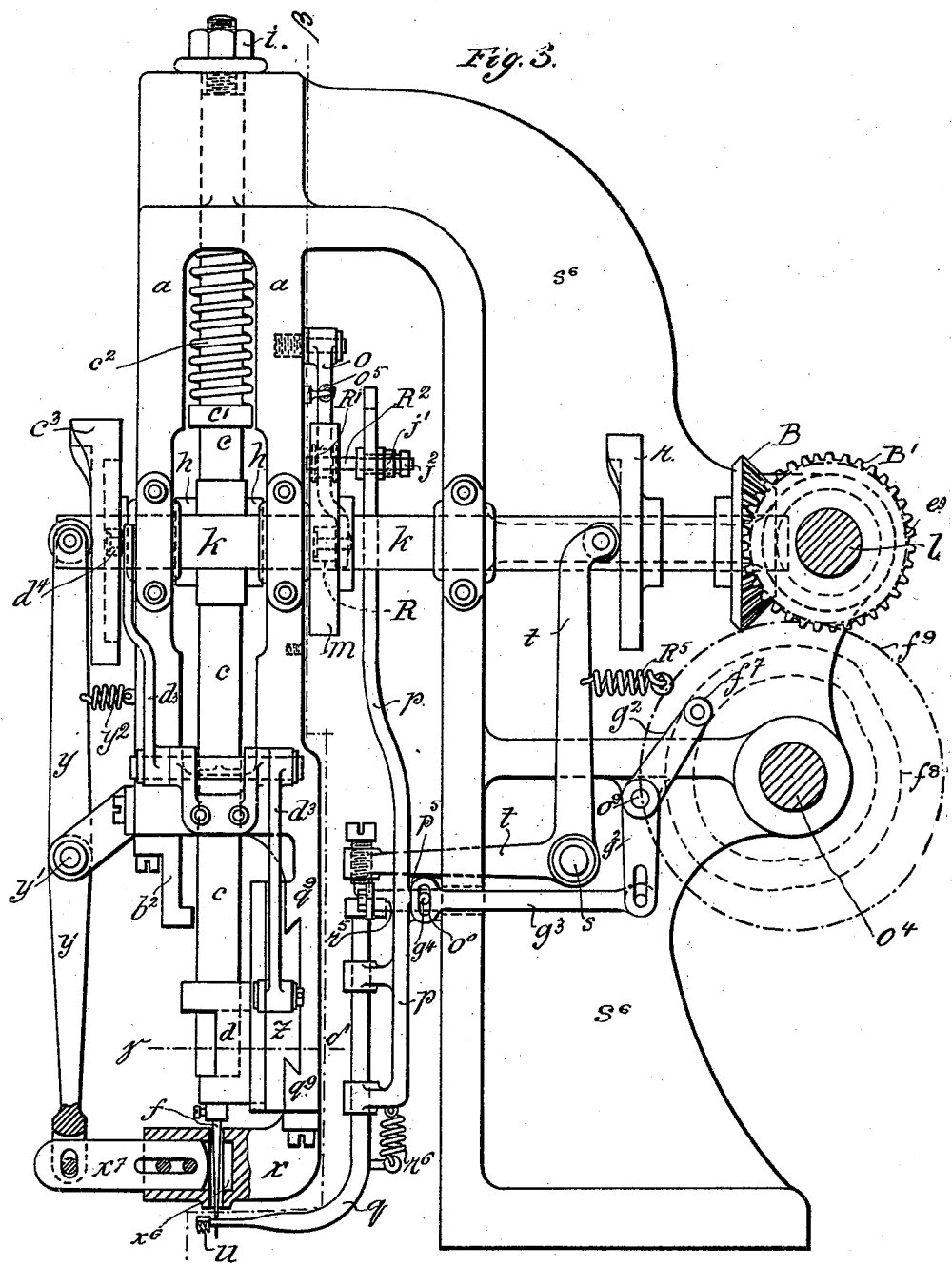

Figure 1 is a side elevation of my machine. Fig. 2 is a front elevation. Fig. 3 is a side elevation of the upper part of the machine drawn to a larger scale, showing the block $x$ in section and the gearing wheels $e^9$ $f^9$ removed, as shown only in dotted lines for the sake of greater clearness. Fig. 4 is a front elevation of Fig. 3 with block $x$ in section. Fig. 5 is a section on line $\alpha \beta$ in Fig. 3. Fig. 6 is a plan of Fig. 3 with all levers and the gearing wheels $e^9$ and $f^9$ removed. Fig. 7 is a section of the guide plate along line $\gamma \delta$ Fig. 3. Fig. 8 shows side and end elevation and plan of block $x$. Fig. 9 shows side and front elevation of hammer levers. Fig. 10 shows side and front elevation and plan of awl or hammer block. Fig. 11 shows the cutter for cutting off ends of pegs inside the boots. Fig. 12 shows plan of sector $k'$ and its levers.

My machine has the following movements: I. Boring the hole in the sole of the shoe for the reception of the peg. II. Cutting off the peg from wood shavings fed into the machine. III. Driving the peg into the hole in the sole of the shoe. IV. Cutting off the end of the peg inside the shoe. V. Transporting the shoe forward the required distance between the pegs for single rows of pegs or moving the shoe zigzag forward when two rows of pegs are required. These five movements are hereinafter described in detail.

I and III. Boring the sole (I) and driving the peg into the hole in same (III). Since these two points in the machine are closely connected, it will be better to describe them together. The upper part of the standard $S^6$ which is fixed to the main standard $s^5$ of the machine supports the guide $a$. The shape of this guide $a$ will be best seen in Figs. 3, 4 and 6. In the upper end of guide $a$ the hammer rod $c$ slides projecting through above and with nut $i$ screwed to its upper end preventing the hammer $c$ from descending too far on being released by double lever $a^5$. The hammer rod C has two projections $h$ $h$ on its sides and a collar at $c'$. On collar $c'$ rests a spring $c^2$ pressing against the top of the guide $a$ and continually forcing hammer rod $c$ downward. The shaft $k$ has its bearings in the sides of the guide $a$ and is driven by bevel wheels B B' from shaft $l$ the latter being set in motion by the pedal $M^9$, connecting rod $M^5$ and fly wheel $M^3$, it can also be driven by sheave pulleys from a main shaft. To shaft $k$ are fixed the double forked lever $a^5$ $a^5$, which when the shaft is turned round, come under the projections $h$ $h$ and drive the hammer rod $c$ upward. The hammer rod $c$ on being released descends by its own weight, assisted by spring $c^2$. As there are two of these forked levers $a^5$ $a^5$ fixed to the shaft $k$, the hammer will of course rise and fall twice at each revolution of the shaft $k$. A short distance from the lower end of the hammer rod $c$ are two square notches $c^9$ $c^9$ (Fig. 4) cut in the same, these notches serve for raising the awl-block $d$ and pegging block $e$. The awl blocks $d$ and hammer block $e$ slide vertically up and down in the guide formed by the back plate $z$ (Figs. 3 and 4) and back plate $z$ slides in its turn horizontally to the right and left in the guide $q^9$ on part $a$ of upper standard $s^6$ of the machine. The horizontal sliding of the plate $z$ is effected by the cam in the disk $c^3$ on the shaft $k$. The roller $d^4$ of the lever arm $d^3$ runs in this cam and oscillates lever $d^3$. The oscillation is communicated to the plate $z$ by the connecting piece $d^6$. (Fig. 4.) The awl slide block $d$ and hammer slide block $e$ are of the same shape and lie next each other, as will be seen from Fig. 4. Each of the two blocks has two projections. The awl block $d$ has the projections $d^7$ and $d^8$. The hammer $c$ descending strikes the projection $d^7$ driving the awl $f$ through the sole of the shoe, after which the projection $d^3$ passes into the notch $c^9$ of the hammer $c$ on back plate $z$ being moved to the left in Fig. 4, whereby the awl block will be taken up when the hammer ascends. When the awl-block $d$ is down, the hammer block $e$ is always in its highest position, as shown in Fig. 4. The working of this part of the machine is as follows: Assuming that the awl $f$ has just been driven through the sole (Fig. 4) and that the plate $z$ has just been moved to the left, so that the projection $d^3$ has passed into the notch $c^9$ of the hammer rod $c$; as the shaft $k$ revolves farther, the arm $a^5$ comes under the projections $h$ $h$ on hammer rod $c$ and lifts the hammer and with it the awl block $d$ while the lever arm $d^3$ and the plate $z$ remain stationary owing to the concentricity of the cam on the disk $c^3$ which remains concentric for the next half turn. As soon as the hammer rod $c$ has reached its highest point, the roller on the lever arm $d^3$ comes into the concentric part of the cam and thereby pushes the back plate $z$ to the right (Fig. 4) and with it the awl block $d$ and hammer block $e$. The awl block $d$ is thus laid on the bracket $b^2$ (Figs. 3 and 4) and remains there until $z$ is again pushed to the left. The hammer block $e$ however, which has been lying on the left hand of bracket $b^2$, is removed from the same and the long thin hammer $g$ attached to the block $e$ is brought exactly over the hole in the stationary block $x$ from which the awl has just been lifted out. In the mean time a wooden peg has been brought into block $x$ (by mechanism described in the next paragraph.) The disk $c^3$ has now revolved so far, that the fork arm $a^5$ comes away from the projection $h$ and the hammer rod $c$ is released and falls down under the pressure of the spring $c^2$ on to the projection $e^7$ of the hammer block $e$ driving the hammer $g$ through the hole in block $x$ and the wooden peg into the sole which was previously bored by the awl. By the further revolving of the disk $c^3$ the plate $z$ is again pushed to the left, the hammer $c$ is again raised by the second fork lever $a^5$, taking with it the hammer block $c$ since the projection $e^8$ has been brought into the left hand notch $c^9$ of the hammer rod. As soon as the hammer has again reached its highest point, the plate $z$ is moved to the right, the hammer block $e$ is laid on the bracket $b^2$ and the awl block $d$ removed from the same to be driven down by the second descension of the hammer. In the mean time the shoe sole has been transported by the mechanism hereinafter described. As will be seen, by each revolution of disk $c^3$ the hammer rod $c$ rises and falls twice, first driving the awl through the sole and then driving the peg into the same.

II. Arrangement for cutting off the peg and placing the same under the hammer. The block $x$ referred to above can be clearly seen in Fig. 8. In this block are two slits $x^5$ and $x^6$, in one of which $x^6$ the knife $x^7$ works and into the other $x^5$ the wood shaving comes from roll $n$ and guides (Figs. 2 and 12). These movements take place in the following manner: The block $x$ is fixed to the lower end $q^9$ of guide $a$. Fixed to the lower part of guide $a$ are two brackets $v^4$ $v^5$ forming the bearings for the shaft $v'$. On the lower end of shaft $v'$ is fixed the small roughened wheel $v^2$ for transporting the wood shaving and on the upper end is fixed the ratchet wheel $v^3$ from which the shaft $v'$ receives its motion. The ratchet wheel is worked by the catch $w'$ which is connected to lever $w$ pivoted at $w^2$. This lever $w$ receives its motion from a projection $i'$ on eccentric $c^3$ (Fig. 4) against which it is continually held by a spring, so that by each complete revolution of the shaft $k$ the ratchet wheel $v^3$ is moved one tooth farther and the roughened transport wheel $v^2$ moves the wood shaving just as much as is required for one peg. The knife $x^7$ (Fig. 3) which works in the slit $x^6$ of the block $x$ receives its motion from the eccentric $c^3$ by means of the double lever arm $y$ pivoted at $y'$. The end of this lever is held against the eccentric $c^3$ by a spring $y^2$ and to the other end is fixed the knife $x^7$ so that by one revolution of the shaft $k$ the knife $x^7$ passes into the slit $x^6$ of the block $x$ and cuts off the peg which remains there until the hammer $g$ enters the block $x$ from above and drives the peg just cut off, into the sole of the boot.

IV. Arrangement for cutting off the end of the peg inside of the shoe: The hollow shaft $a'$ (Figs. 1 and 2) is supported in its bearings $p^9$ $p^9$ fixed to the main standard $s^5$ of the machine and fixed to this hollow shaft $a'$ is the horn $b'$. Inside the hollow shaft $a'$ is a second shaft $f'$ passing through the whole length of the hollow shaft $a'$ and resting with its under end on a cone $j$ carried in the strap $p^7$ fixed to the lower end of shaft $a'$. The other end of this shaft $f'$ lies in the horn $b'$ and has keyed to it the bevel wheel $p^8$; this wheel gears into bevel wheel $p^6$, which is keyed to the horizontal shaft $m'$ in horn $b'$. On the other end of shaft $m'$ is bevel wheel $n'$ gearing into wheel $n^2$ and driving shaft $m^2$ which lies at an angle of about forty-five degrees to shaft $m'$ in the vertical plane. The shaft $m^2$ has on its upper end a toothed cone (Fig. 11) which drives bevel wheel $n^3$. Eccentrically fixed to the upper surface of wheel $n^3$ is the knife for cutting off the end of the peg inside the shoe (Fig. 11) the cutting edge of this knife lies in the horizontal plane and describes a circle by each revolution of bevel wheel $n^3$. The whole gearing arrangement just described is driven by pinion $h'$ fixed to the bottom end of the vertical shaft $f'$ (Fig. 1) and into which the toothed segment $k'$ works. The toothed segment $k'$ turns on its center $i^2$ and is worked from the pedal shaft $d^9$ by the levers $l'$ $l^2$ and rocking shaft $l^3$ pivoted at $l^4$ and connected with the segment $k'$ (as shown in Figs. 1 and 12) by universal joint $l^5$ and connecting arm $l^6$. The universal joint can slide on rocking shaft $l^3$, the part on which it slides being square to prevent its turning. By each stroke of the pedal the knife on the wheel $n^3$ will make one revolution and that takes place exactly after the hammer $g$ has driven the peg into the sole of the shoe, so that the end of this peg will be cut off before the shoe sole is removed by the transporting apparatus.

V. Arrangement for transporting the shoe forward the required distance between the pegs for single rows of pegs or of moving the same forward in a zigzag manner when two rows of pegs are required (Figs. 3 and 5). Close by the hole in the block $x$ where the awl comes through is situated the transporter consisting of the small curved and spiked pieces $u$. It is supported and movable in three directions by means of the bent arm $q\ q$ (Figs. 3 and 5). The transporting lever for one row of pegs is worked by eccentric $m$ in the following manner: Pivoted to the side of the guide $a$ is a lever arm $o$ having at its lower end a roller $R$ which runs on eccentric $m$ and is oscillated thereby backward and forward, being held against it by spring $o^5$. This lever arm $o$ has a slit in which roller $R'$ runs. The roller $R'$ is adjustable in a slit in the end of double armed lever $p$ by a collar and nut $j'$; the pin $R^2$ of the roller $R'$ passes through the collar, bolt and nut $j'$ and is secured by nut $j^2$ so that the lever $p$ may be moved to the left in Fig. 3 by the mechanism hereinafter described. Lever $p$ is pivoted to the standard $S^6$ at $r^5$ and in its lower end the bent arm $q$ can slide vertically up and down. By moving the roller $R'$ higher up, the upper arm of the lever $p$ becomes longer and the lower arm will describe a shorter way at each oscillation, while by placing the roller lower down the upper arm becomes shorter and the way described by the lower arm longer. By this means it is possible to regulate the distance between the pegs in the sole of the boot. The arm $q$ is under influence of the spring $r^6$ which continually tends to draw it upward. On the shaft $k$ besides the eccentrics $m$ and $c^3$ is an eccentric disk $r$ against the side of which the bent lever $t$ is held by spring $R^5$. The bent lever $t$ is pivoted at $s$ to the standards $S^6$ and its other end rests on the top of the rod $q$. When the shaft $k$ revolves, the rod $q$ receives an up and down motion by means of the lever $t$ and disk $r$. The working of this part of the machine is the following:—When the shaft $k$ revolves, the lever arm $p$ will be oscillated by means of the eccentric $m$ and lever $o$, with it the arm $q$ and curved piece $u$. The curved piece $u$ with its spikes will however during the oscillation be pressed down on to the shoe sole by the working of the disk $r$ on the bent lever $t$, so that by each revolution of the shaft $k$ the shoe sole will be moved forward by exactly so much as shall correspond to the required distance between the pegs, i. e. according as how the roller $R'$ has previously been regulated. When two rows of pegs are required the shoe must be moved forward in a zigzag manner which is accomplished by the following mechanism. On the shaft $l$ is a cog wheel $e^9$ which gears into a cog wheel $f^9$ which runs on the pin $o^4$. In the side of the cog wheel $f^9$ is a cam $f^8$ in which a roller $f^7$ runs, which is fixed on the end of the bent lever arm $g^2$ which is pivoted at $o^9$. The one end of this bent lever $g^2$ has a slit in which lever $g^3$ is adjustable, the other end of the arm $g^3$ is provided with a slit $o^3$ in which pin $g^4$ on boss $p^5$ of lever $p$ lies. The whole lever $p$ may be pushed forward on its pivot $r^5$ (Fig. 3). When now two rows of pegs are required, the action is as follows: When the spiked piece $u$ is being moved forward (as in the manner described above when only one row of pegs is desired) the lever $p$ containing the arm $q$ is moved by the cog wheels $e^8$ and $f^9$, cam $f^8$ and levers $q^2$ and $q^3$ in a direction at right angles in the horizontal plane to that given to it by lever $p$. When the shoe has just been moved forward in a diagonal direction the bent lever $t$ rises and the transporter $u$ is lifted from the shoe. The lever $p$ remains however in the forward position (that is, on the left hand end of its pivot $r^5$ in Fig. 3) because cam wheel $f^9$ only makes one revolution while shaft $k$ is making two, so that the second movement of transporter $u$ will be in a diagonal line from left to right (Fig. 3) while the first was from right to left; the shoe sole will thus be moved forward in a zigzag manner and two rows of pegs formed. Should only one row of pegs be required, the cop wheel is loose on the shaft while the disk is keyed on to the same so that when the cog wheel $e^9$ is loosened, the disk alone revolves and the cog-wheels $e^9$ and $f^9$ are placed out of gear.

It only remains now to describe the manner in which the work may be placed out of the machine while the same is in motion. To the lower end of the shaft $a'$ is loosely fixed the strap $p^7$ (Fig. 11) connected by means of a rod $o^3$ with the second pedal $d'$ which is loose on the pedal shaft $d^9$. The shaft $a'$ can slide vertically up and down in its bearings $p^9\ p^9$ but is supported by springs $o'\ o'$. If it is desired to remove the shoe from the machine for a moment without stopping the same, it is only necessary to press the pedal $d'$ down when the hollow shaft is drawn downward and with it the horn $b'$ so that the shoe is placed out of reach of the awl and hammer. In order to relieve the shoe from the pressure of the spiked curved transporter $u$ while the machine is not working, the lever $e'$ is provided loose on shaft $d^9$ and on being moved forward catches on to the pin $e^7$ on the fork $p^7$ holding the horn down.

Having now described the manner in which each separate part of the machine works, it remains to describe the working of the whole machine: When the shaft $l$ makes one revolution the shaft $k$ will also make one revolu- tion as the bevel wheels are the same size. During one revolution of the shaft $k$ the whole five movements just described take place in the following order: The shoe is first placed on the horn $b'$. First quarter of the turn; raising the hammer rod $c$ by means of one of the fork levers $a^5$ and with it the hammer $g$ and hammer block $e$, movement of the back plate $z$ toward the left (Fig. 4) by means of lever arm $d^3$ and thereby placing hammer block $e$ on left hand side of bracket $b^2$ and releasing awl block $d$ from right hand side of bracket $b^2$ and bringing projection $d^8$ of the same into notch $c^9$ of hammer rod $c$. Second quarter turn; releasing of hammer rod $c$ and falling of the same under influence of spring $c^2$ with the awl block $d$ whereby awl $f$ is driven through the sole of the shoe. Third quarter turn; upward movement of hammer rod $c$ and with it awl block $d$; movement of back plate $z$ to right (Fig. 4) thereby releasing hammer block $e$ from bracket $b^2$ and bringing projection $e^8$ of the same into left hand notch $c^9$ of hammer rod $c$ and bringing awl block $d$ on to bracket $b^2$ so that the same is held from falling: turning of ratchet wheel $v^3$ one tooth whereby wood shaving pushed into slit $x^5$ in block $x$ and pushing knife into slit $x^6$ in block $x$ cutting off peg and drawing knife back. Fourth quarter turn; descension of hammer rod $c$ with hammer $g$ driving peg into the sole of shoe; cutting off the end of peg inside in shoe by the knife bevel wheel $n^3$; transport of shoe by means of curved spiked piece $u$, lever arm $o$, $p$ and $t$ and disks $r$ and $m$ the required distance between the pegs, when two rows are required in a zigzag direction with help of cog wheels $e^9$ and $f^9$, cam $f^8$ and levers $g^3$ and $g^2$. The shoe can be placed out of reach of the hammer and awl at any time by means of the pedal $d'$, in the manner previously described.

Having thus fully described the nature of my invention, what I desire to secure by Letters Patent of the United States is—

1. In a pegging-machine: the rotary shaft ($k$) having arms ($a^5 a^6$) and the cam disk ($c^3$) mounted thereon, the hammer ($c$) provided with notches and gliding twice up and down during one rotation of shaft ($k$), the sliding guide plate ($z$) having awl-and hammer-slide-blocks ($e$ and $d$), both having projections adapted to take into said notches, the two brackets ($d^2$) and lever connecting cam disk ($c^3$) and slide-plates ($z$), in the manner specified.

2. In a pegging-machine: the rotary shaft ($k$) having eccentric ($m$) and eccentric disk ($r$) mounted thereon, eccentric ($m$) operating transporter ($u$) horizontally by slit lever ($o$) with roller (R) and lever ($p$) with adjustable roller (R'), disk ($r$) operating transporter ($u$) vertically by lever ($l$) and rod ($q$), the latter being held and guided by lever ($p$), substantially as described.

3. The combination of the shafts ($k, l$ and $o^4$), geared by wheels (B B') and ($e^9 f^9$), wheel (B) driving shaft ($k$) with eccentrics ($r$) and ($m$), wheel ($f'$) having cam ($f^8$) operating lever ($g^2$) with rod ($g^3$), the latter moving lever ($p$) with rod ($q$) and transporter ($u$) forward and backward, substantially as described.

4. The combination of hollow shaft ($a'$), being vertically displaceable as well as rotatable in a horizontal plane and carrying horn ($b'$) with cutter ($n^3$) and intermediate gearing for operating the latter, the hollow shaft ($a'$) holding shaft ($f'$) with pinion ($h'$), operated by toothed sector ($k$) and acting on the intermediate gearing within horn ($b'$), substantially as described.

5. The combination of hollow shaft ($a'$) and inner shaft ($f'$), supported by strap ($p^7$) and springs ($o'$), with rod ($o^3$) and pedal ($d'$), strap ($p^7$) having pin ($e^7$), a lever ($e'$) being provided on shaft ($d^9$) and catching pin ($e^7$) in its lower position, substantially as described.

In witness whereof I have hereunto set my hand in presence of two witnesses.

RUDOLPH LEY.

Witnesses:
CARL BORNGRAEBER,
ERNST SCHOLZ.